(12) United States Patent
Saha et al.

(10) Patent No.: US 12,242,430 B2
(45) Date of Patent: Mar. 4, 2025

(54) CLOUD DRIVE MANAGEMENT

(71) Applicant: SAP SE, Walldorf (DE)

(72) Inventors: Rajib Saha, Bengaluru (IN); Ghislain Hude, Levallois-Perret (FR)

(73) Assignee: SAP SE, Walldorf (DE)

(*) Notice: Subject to any disclaimer, the term of this patent is extended or adjusted under 35 U.S.C. 154(b) by 58 days.

(21) Appl. No.: 18/192,409

(22) Filed: Mar. 29, 2023

(65) Prior Publication Data
US 2024/0330246 A1   Oct. 3, 2024

(51) Int. Cl.
*G06F 17/00* (2019.01)
*G06F 7/00* (2006.01)
*G06F 16/182* (2019.01)
*G06F 16/185* (2019.01)

(52) U.S. Cl.
CPC .......... *G06F 16/183* (2019.01); *G06F 16/185* (2019.01)

(58) Field of Classification Search
CPC .............................. G06F 16/183; G06F 16/185
USPC ........................................................... 707/827
See application file for complete search history.

(56) References Cited

U.S. PATENT DOCUMENTS

| | | | | |
|---|---|---|---|---|
| 2014/0281875 A1* | 9/2014 | Branton | ................ | G06F 40/169 |
| | | | | 715/230 |
| 2017/0177613 A1* | 6/2017 | Sharma | ................... | G06F 21/45 |
| 2017/0214963 A1* | 7/2017 | Di Franco | .......... | H04N 21/4227 |
| 2018/0307702 A1* | 10/2018 | Kube | ................... | G06F 16/1844 |
| 2023/0185462 A1* | 6/2023 | Saha | ..................... | G06F 3/0605 |
| | | | | 711/163 |

OTHER PUBLICATIONS

U.S. Patent Application entitled "Holistic Way of Cloud Connector Integration on Existing On-Premise Product" U.S. Appl. No. 17/546,441, filed Dec. 9, 2021, 26 pages.

* cited by examiner

*Primary Examiner* — Pavan Mamillapalli

(74) *Attorney, Agent, or Firm* — Fountainhead Law Group, PC

(57) ABSTRACT

Interaction with different remote cloud drives is achieved utilizing a drive engine comprising a browsing component and a file manager. The browsing component receives from a consumer, a request to perform an action (e.g., upload; download) with a particular cloud drive. In response to the request, the browsing component retrieves a directory from the cloud drive. The browsing component generates a JavaScript Object Notation (JSON) object including the directory, a placeholder, and a parameter, communicating same to the consumer. The file manager in turn receives from the consumer, the JSON object including selected directory information (e.g., upload destination folder; file for download). The file manager fills in the placeholder with a value. Based upon the value, the file manager communicates an action request to the cloud drive. In response, the file manager receives an action output (e.g., upload confirmation; downloaded content) from the remote storage, forwarding same to the consumer.

20 Claims, 8 Drawing Sheets

CLOUD DRIVE MANAGEMENT

BACKGROUND

Unless otherwise indicated herein, the approaches described in this section are not prior art to the claims in this application and are not admitted to be prior art by inclusion in this section.

A variety of on-premises software products have been operating for many years. However, companies are increasingly moving toward a cloud-based infrastructure.

One specific trend is to store data on a remote cloud drive. However, different cloud drives exist, each having particular specific requirements for interoperability.

SUMMARY

Management of remote cloud drive(s) is achieved utilizing a drive engine that includes a browsing component and a file manager. The browsing component receives from a drive consumer, a request to perform an action (e.g., upload; download) with a particular remote cloud drive. In response to the request, the browsing component retrieves a directory from the cloud drive. The browsing component generates a JavaScript Object Notation (JSON) object including the directory, a placeholder, and a parameter, and communicates same to the drive consumer. The file manager in turn receives from the drive consumer, the JSON object including selected directory information (e.g., upload destination folder; file for download). The file manager fills in the placeholder with a value stored in a local non-transitory computer readable storage medium. Based upon the value, the file manager communicates an action request to the cloud drive. In response, the file manager receives an action output (e.g., upload confirmation; downloaded content) from the remote storage, and communicates the action output to the drive consumer. In this manner, a drive consumer may effectively interact with a plurality of remote cloud drives, each having a different interface calling for different parameters.

The following detailed description and accompanying drawings provide a better understanding of the nature and advantages of various embodiments.

DETAILED DESCRIPTION

Described herein are methods and apparatuses that implement cloud drive management. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
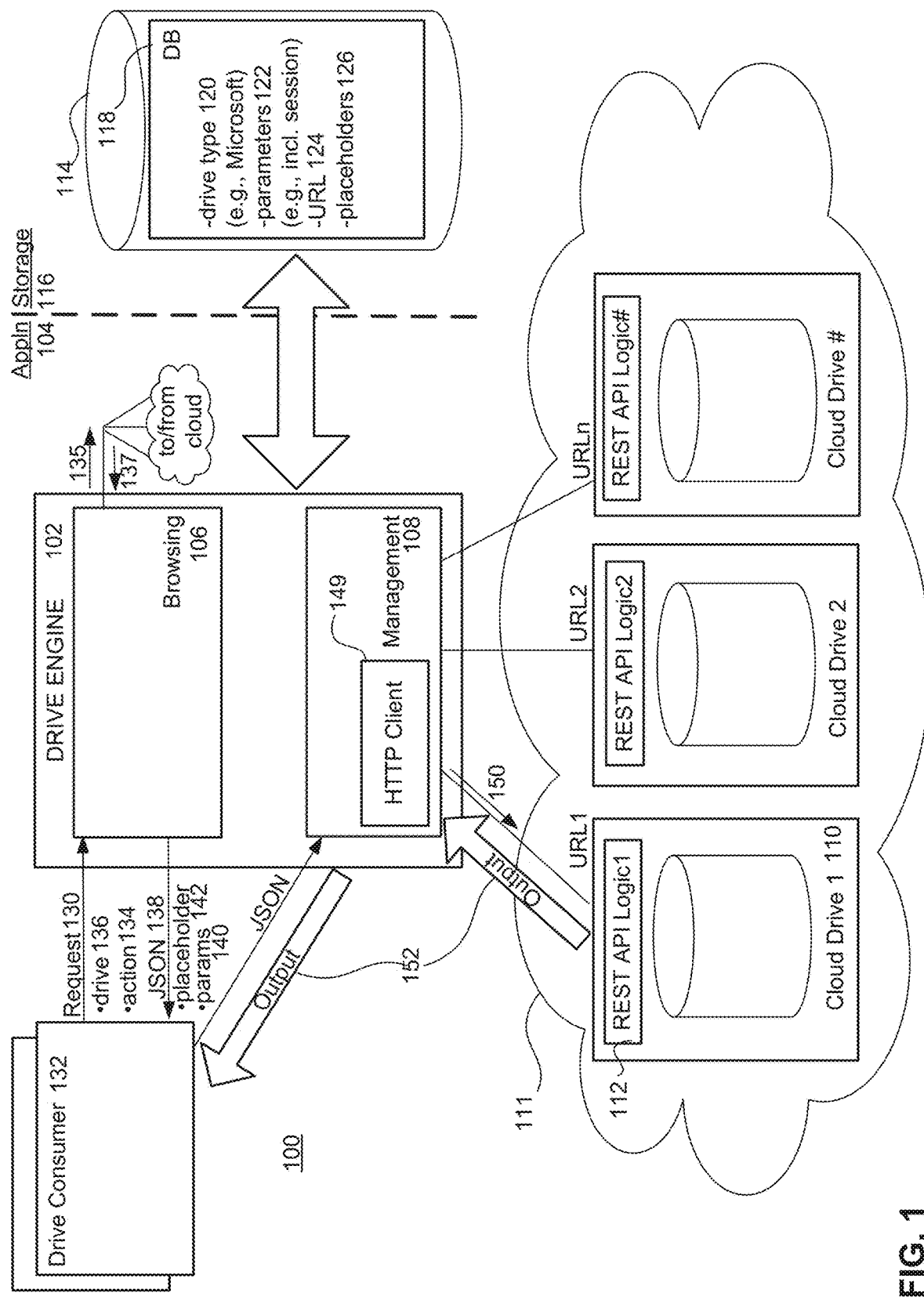
FIG. 1 shows a simplified diagram of a system according to an embodiment.

FIG. 1 shows a simplified view of an example system that is configured to implement cloud drive management according to an embodiment. Specifically, system 100 comprises a drive engine 102 that is located in an application layer 104.

The drive engine includes a browsing component 106 and a management component 108. Both of these elements are in communication with one or more drives 110 that are remotely located in the cloud 111.

These remote drives each have different URLs, and may be of different types. Each remote drive includes respective logic 112 for its particular Representational State Transfer (REST) Application Programming Interfaces (API).

The drive engine is further in communication with a non-transitory computer readable storage medium 114 that is located in storage layer 116. As described in detail below, various types of data such as drive type 120, parameters 122, URLs 124, and placeholders 126 is stored within database 118 within the non-transitory computer readable storage medium.

In operation, the browsing component receives an action request 130 from a drive consumer 132. The request specifies an action 134 and identifies 136 the particular cloud drive to which the action is directed.

A variety of possible actions can be requested by the drive consumer. Such actions can include, but are not limited to:
 upload a file to the specific cloud drive,
 download a file from the specific cloud drive,
 rename a file present in the specific cloud drive,
 determine info of file present in specific cloud drive, and
 others.

The browsing component then interacts 135 with the cloud drive specified, in order to retrieve 137 a hierarchy directory therefrom. That hierarchy directory may specify nodes (e.g., folders, files) for the action. The hierarchy direction may be in the form of a tree.

From the hierarchy directory, the browsing component constructs a JavaScript Object Notation (JSON) object 138. That JSON includes a parameter 140 and a placeholder. Details regarding such a JSON object are discussed later below in connection with FIG. 5A of the (upload action) example.

The browsing component communicates the JSON back to the consumer of drive. There, the consumer modifies the JSON based on the returned directory information.

For example, in connection with an upload action, the consumer may select a destination folder item from a directory tree. In connection with a download action, the consumer may select a file that is to be downloaded.

Then, the consumer communicates the JSON including the placeholder and the selection, to the management component of the drive engine. The management engine fills in the placeholder. Details regarding such a JSON object having a placeholder filled in, are discussed later below in connection with FIG. 5B of the (upload action) example.

Using a HTTP Client component 149, the management engine communicates the request 150 for the action to the REST API of the remote cloud drive, that has been identified by the consumer.

The cloud drive then returns an output 152 to the management component. For example, in connection with a download request, the output may comprise content of a file stored at the remote drive. In connection with an upload request, the output may comprise a confirmation of successful upload.

The management engine receives the output. Then, the management engine forwards this output to the consumer for its reference and use.

Figure 2:
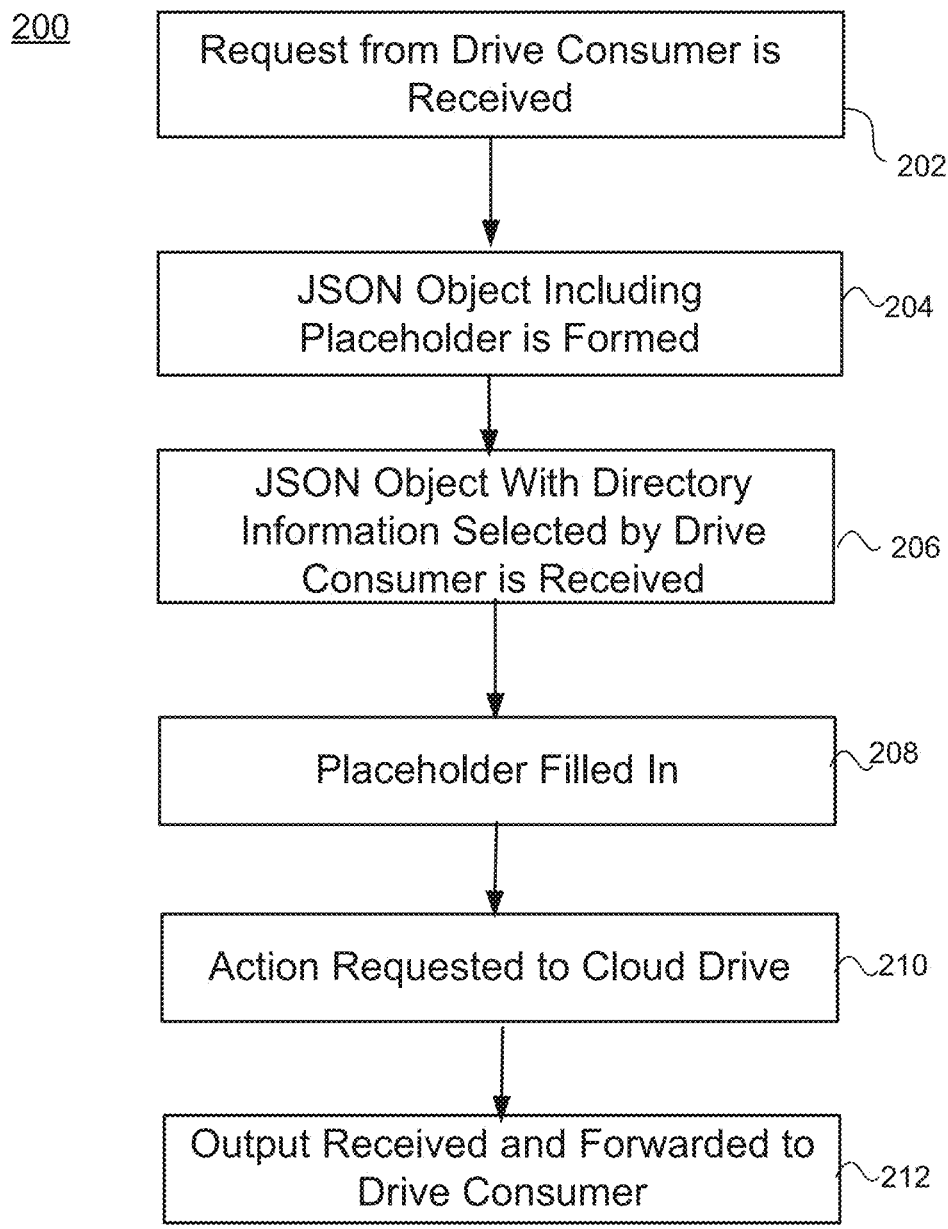
FIG. 2 shows a simplified flow diagram of a method according to an embodiment.

FIG. 2 is a flow diagram of a method 200 according to an embodiment. At 202, a request is received from a drive consumer.

At 204, a JSON object including a placeholder is formed. At 206, the JSON object including selected directory information is received from the drive consumer.

At 208, the placeholder is filled in with a value. At 210, based upon the value an action at a remote cloud drive is requested.

At 212, an output from the action at the remote cloud drive is received and forwarded to the drive consumer.

Further details regarding cloud drive management according to various embodiments, are now provided in connection with the following example. In this particular example, cloud drive management is implemented with the Business Objects Enterprise (BOE) software platform that is available from SAP SE of Walldorf, Germany, and the OneDrive cloud storage framework available from Microsoft Corp. of Redmond, Washington.

EXAMPLE

Figure 3:
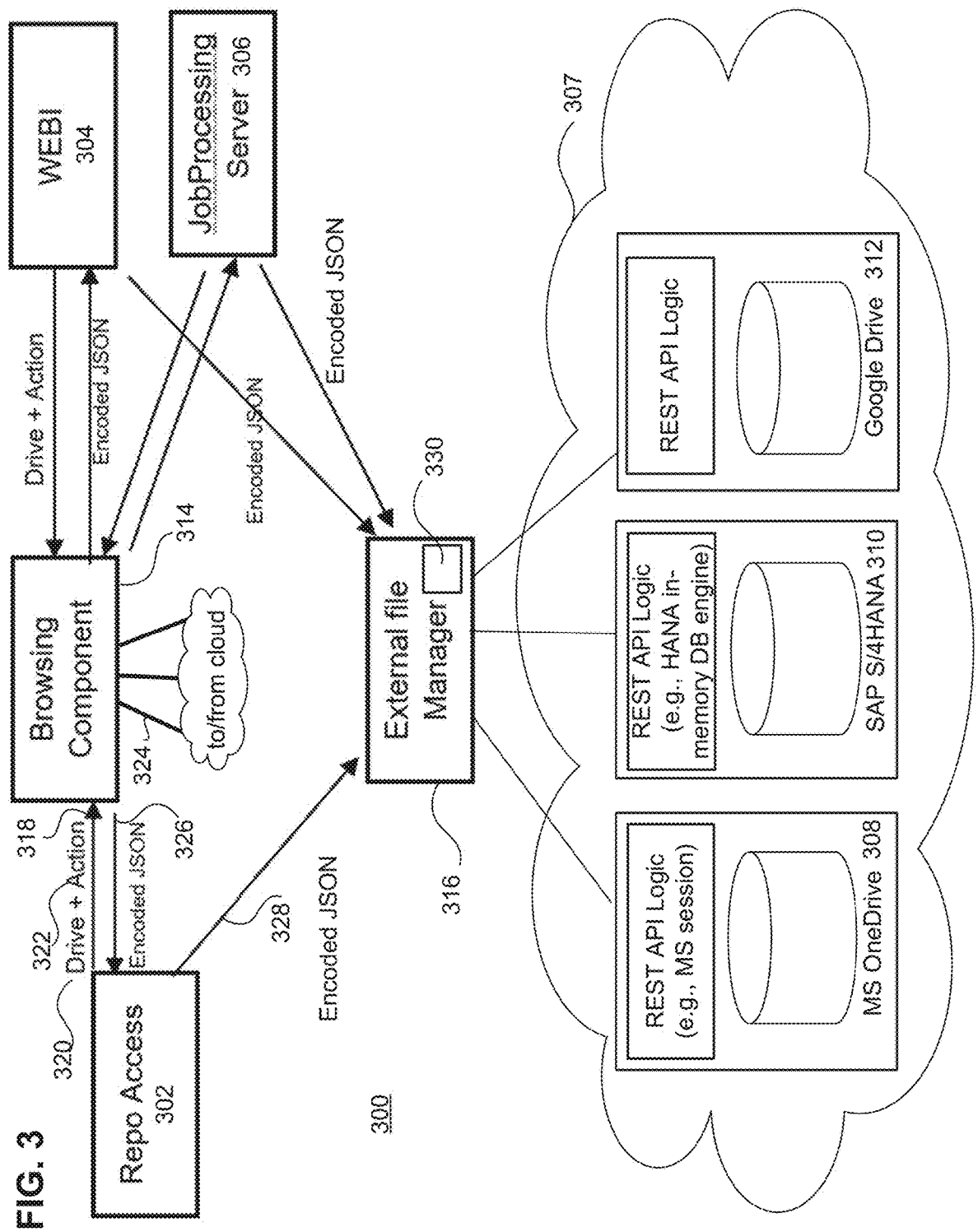
FIG. 3 shows an example of a system implementing cloud drive management according to an embodiment.

FIG. 3 shows a simplified diagram of a system 300 in the example. Here, the BOE platform comprises at least the three (3) following distinct cloud drive consumers:
Repository (Repo) Access component 302;
WEBI 304; and
JobProcessing Server 306.

FIG. 3 also shows three (3) different possible available remote drives that are located in the cloud 307:
Microsoft OneDrive 308;
SAP S/4HANA 310; and
Google Drive 312.

Each of these different cloud drives operates according to its own respective internal logic. For example, the logic to use Representational State Transfer (REST) APIs for the various cloud drives, may differ even for a same action (e.g., upload; download) that is to be performed.

Thus, Google Drive may be able to perform a file upload action in a single step. By contrast, Microsoft OneDrive may need to first create a session, and then upload the file during that particular session.

Accordingly, in order to facilitate interaction between BOE/its various consumers and the different cloud drives in this example, a drive browsing component 314 (written in JAVA) and an External file manager 316 (written in C++) are introduced.

Figure 4:
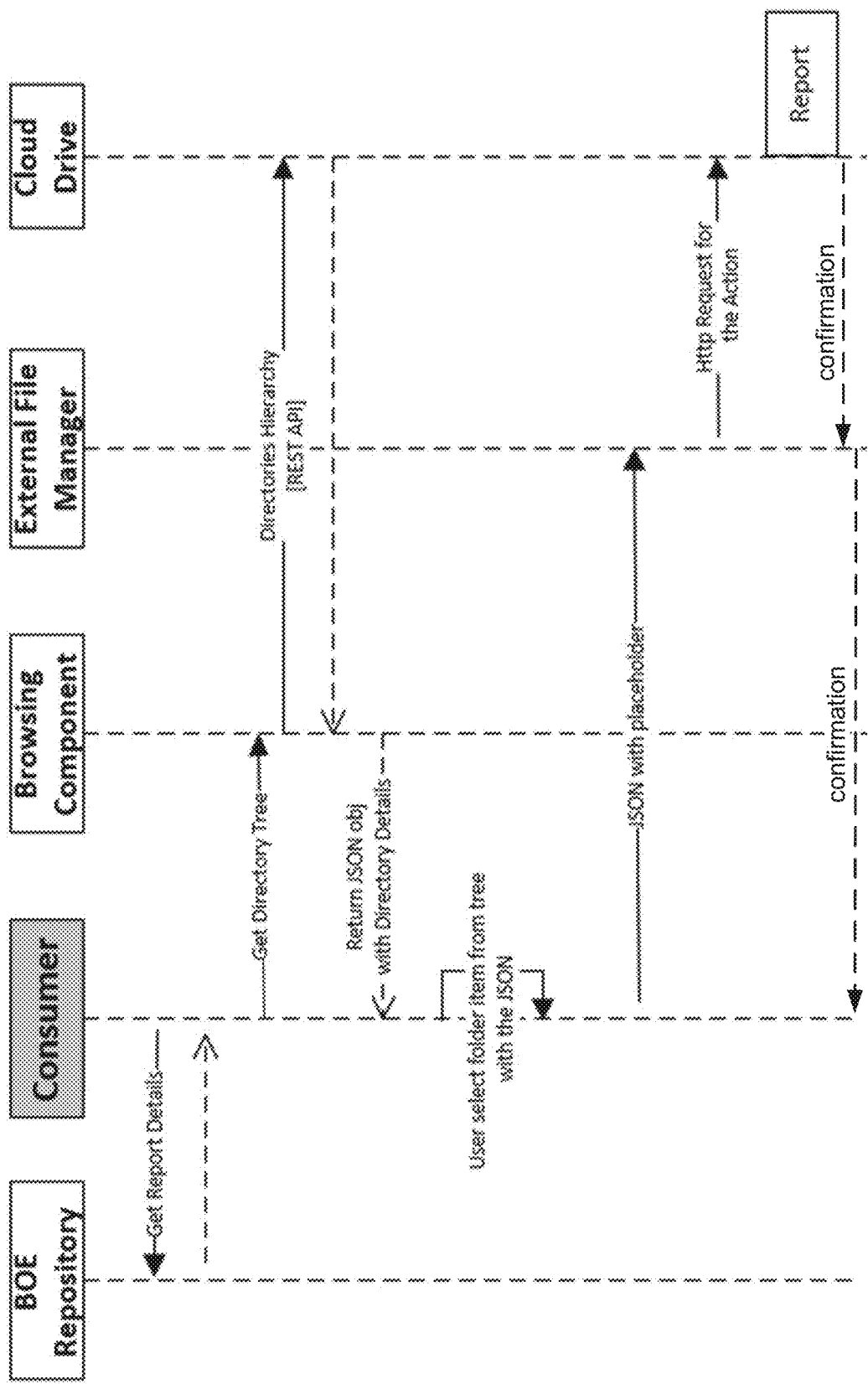
FIG. 4 shows a simplified flow diagram of an upload action in an example.

FIG. 4 shows a simplified flow diagram of activities and components involved in a BOE report upload action to a cloud drive. Here, the Consumer is represented by the module RepoAccess, JobProcesingServer, WEBI module.

The consumer first identifies, which report is to be uploaded from the BOE Repository. Then, the Consumer selects which cloud Drive is to be set as the destination for the upload action.

Once the destination cloud drive has been selected, the consumer need to select the folder in the cloud drive as the destination place. To select the destination folder, Consumer sends request to Browsing Component.

The BOE consumers seeking cloud operation, will thus contact the Browsing component. This request 318 contact will specify both of the following:
a drive 320 (e.g., Microsoft OneDrive); and
an action 322 (e.g., folder upload).

In response to the request received from the consumer, the Browsing component sends a REST API call 324 to the cloud Drive in order to obtain the Directory ID for the Root Folder. Based on the Folder ID, the Browsing component forms an (encoded) JSON 326 and sends it to the requesting Consumer.

It is noted that until it finalizes the correct choice, the Consumer keeps on sending the request to Browsing Component for the Child folder of the displayed cloud drive. Thus, the Consumer is able to pick a correct destination folder from the Cloud Directory Tree.

Based upon the request received from the consumers, the browsing component will form the JSON object. Once correct folder is selected, the browsing component sends to consumers the JSON with a placeholder object with base64 encoded.

Figure 5:
FIG. 5A shows a JSON including a placeholder according to the example.
FIG. 5B shows a JSON with placeholder filled in according to the example.

FIG. 5A shows a sample JSON object formed by the browsing component. The JSON object includes the REST API. In FIG. 5A, the REST API is indicated by the following Uniform Resource Locator (URL):

---

"https://graph.microsoft.com/v1.0/drives/{ driveIdentifier }/ items/
{nodeIdentifier}:/
{filename}:/createUploadSession"},
where { driveIdentifier } and {nodeIdentifier} are placeholders.

---

The JSON object also includes other parameters necessary to perform the action requested by the consumer. Such parameters, together with sample values, are given below.

| Parameter | Sample Value |
|---|---|
| UID of the file/folder | "01R3S4XLIVFGTSI4PSU5CK5U4K2KDKUFSF" |
| nodeType | "folder" |
| driveType | "microsoftdrive" |
| Drive Id | "b!rChJ4HCz6k2Ys9anMtZlwdB8aiPzlfRFrc_4wuPOtKy0LvP4CO0USIGZbjpaFX5u" |

The JSON object with base64 encoded byte array, is sent 328 by the Consumer to the External file Manager. That JSON includes file details for the upload.

The External file Manager is centralized module which takes care of different consumer-requested actions, based upon its specific Cloud Drive. This External file Manager module reduces the burden on consumers (e.g., to interact with a variety of different types of cloud drives).

In particular, the External file Manager takes care of managing all REST APIs of different cloud drives. This is based upon the Consumer specifying the Cloud drive, action (s), and file name/uid to the External file Manager.

The External file Manager will provide the logic to execute REST APIs specific to the cloud drive, and convey the output to the consumer.

The External file Manager decodes the encoded byte array received from the consumer. The External file Manager replaces the placeholder of REST APIs with appropriate parameters.

Figure 6:
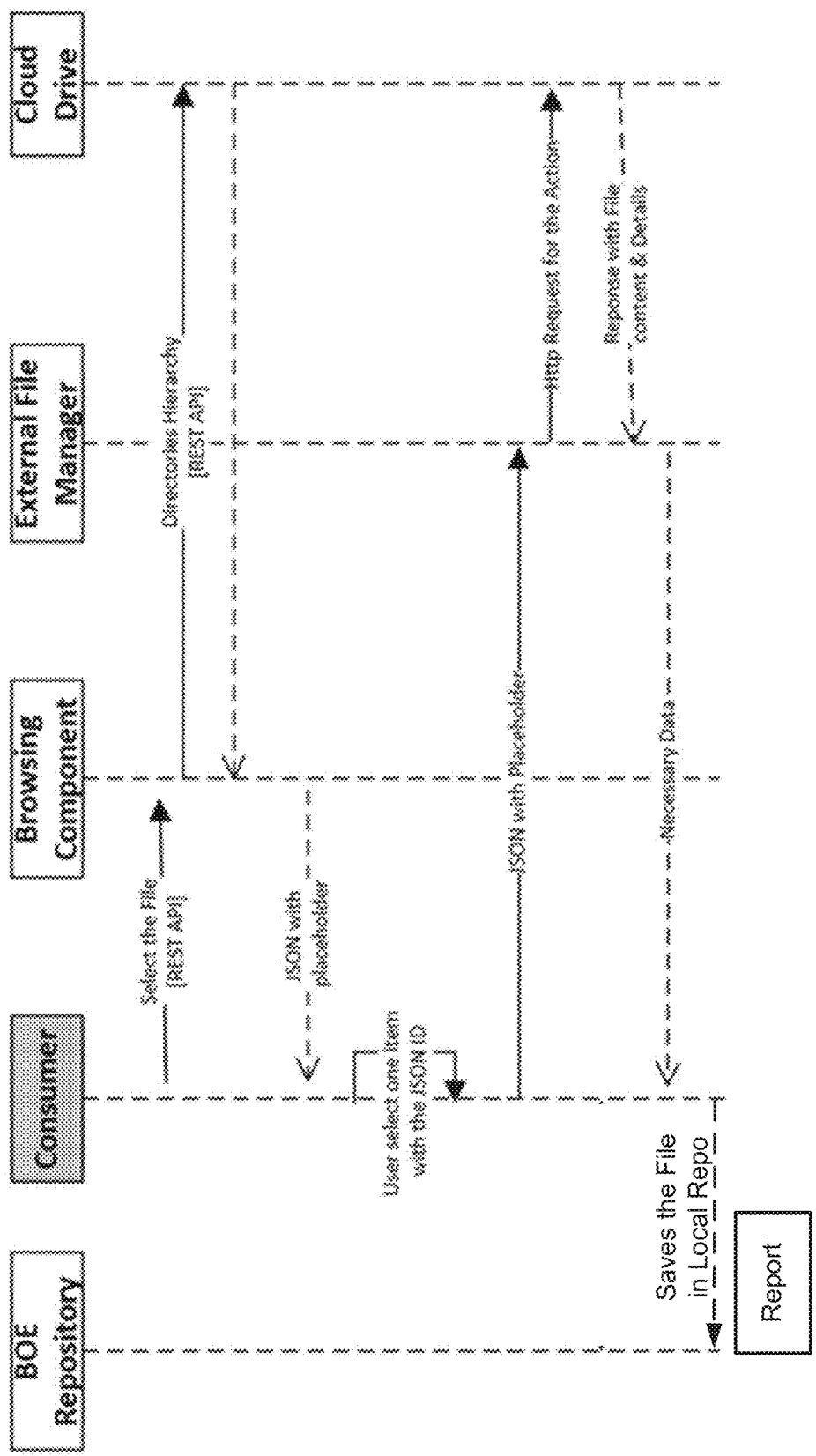
FIG. 6 shows a simplified flow diagram of a download action in an example.

In this example, upon replacing the placeholder from the JSON passed by the consumer, the decoded JSON in the External file Manager will be as shown in FIG. 6.

Thus, based upon the particular cloud drive that is specified (e.g., from the "driveType" key="microsoftdrive" in the JSON), the External file Manager will handle the drive consumer's request, and provide the output from the requested action back to the drive consumer.

Thus, in this upload example, the External file Manager decodes the JSON object and fills the place holders for REST API call to the cloud Drive. With the help of HTTP Client 330, the External file Manager sends the upload request to the cloud Drive to update the file stored remotely there. In this manner, a local BOE Report is sent to a different, remote Cloud drive destination seamlessly.

The above has focused upon an upload action to a cloud drive. However, embodiments are not limited to this or any particular action. Other possible file operations on cloud drives that can be performed according to embodiments, include but are not limited to:
rename file,
grant file access,
file modification,
download, and
others.

As an illustration of this, FIG. 6 shows a simplified flow diagram of a download action. In this case, a BOE report file is to be downloaded from a specific remote cloud drive to the local BOE repository.

Again, the Consumer is represented here by the module RepoAccess, JobProcesingServer, and WEBI modules of BOE. First, the Consumer chooses from which cloud drive to download a file.

Once the destination cloud drive is selected, the consumer needs to select the file in drive to download. To select the file, the consumer sends a request to the Browsing component.

Then, the Browsing component sends REST API call to the Cloud Drive to get the Directory ID for the Root Folder.

Based on the Folder ID, the Browsing component forms a JSON and sends to the Consumer. Again, the Consumer keeps on sending until it finalizes the correct choice, the request to Browsing component for the Child file/folder of the displayed one. In this manner the Consumer is able to pick a correct file from the Cloud Directory Tree to download.

Once the correct file is selected, the Browsing component sends to the Consumer, the JSON including the placeholder object with base64 encoded.

The Consumer then sends the base64 encoded JSON to External file Manager for the download. The External file Manager decodes the JSON object and fills the placeholders for REST API call to Cloud drive.

With the help of the HTTP Client, the External file manager sends the Request to Cloud Drive to download the file. The downloaded file is stored in BOE Repository by the Consumer. In this manner, the file stored remotely in the cloud drive is seamlessly downloaded to the local repository.

Cloud drive management implemented according to various embodiments, may offer one or more benefits. Specifically, one possible benefit is to facilitate adoption of different types of cloud drives in a centralized module.

Another benefit is simplification. That is, use of such a centralized module reduces the need for repetitive/duplicative code.

Still another possible benefit is ease of use. The cloud drive consumer is not tasked with shouldering the burden of having to explore R&D upon different (even future) cloud APIs and parameters and uses.

Yet another possible benefit is forward adaptability. That is, the different functionalities and parameters required by future cloud drive types are unknown. The instant embodiment offers a central location to conform to interact with multiple future cloud drive specifications.

Still another possible benefit is scalability. As shown in the above example, a single processing platform (BOE) may comprise multiple consumers seeking to interact with remote cloud drive(s). Embodiments provide a centralized location to manage those cloud drive interactions for any number of different consumers.

Returning now to FIG. 1, there the particular embodiment is depicted with the drive engine as being located outside of the database. However, this is not required.

Rather, alternative embodiments could leverage the processing power of an in-memory database engine (e.g., the in-memory database engine of the HANA in-memory database available from SAP SE), in order to perform one or more various functions as described above.

Figure 7:
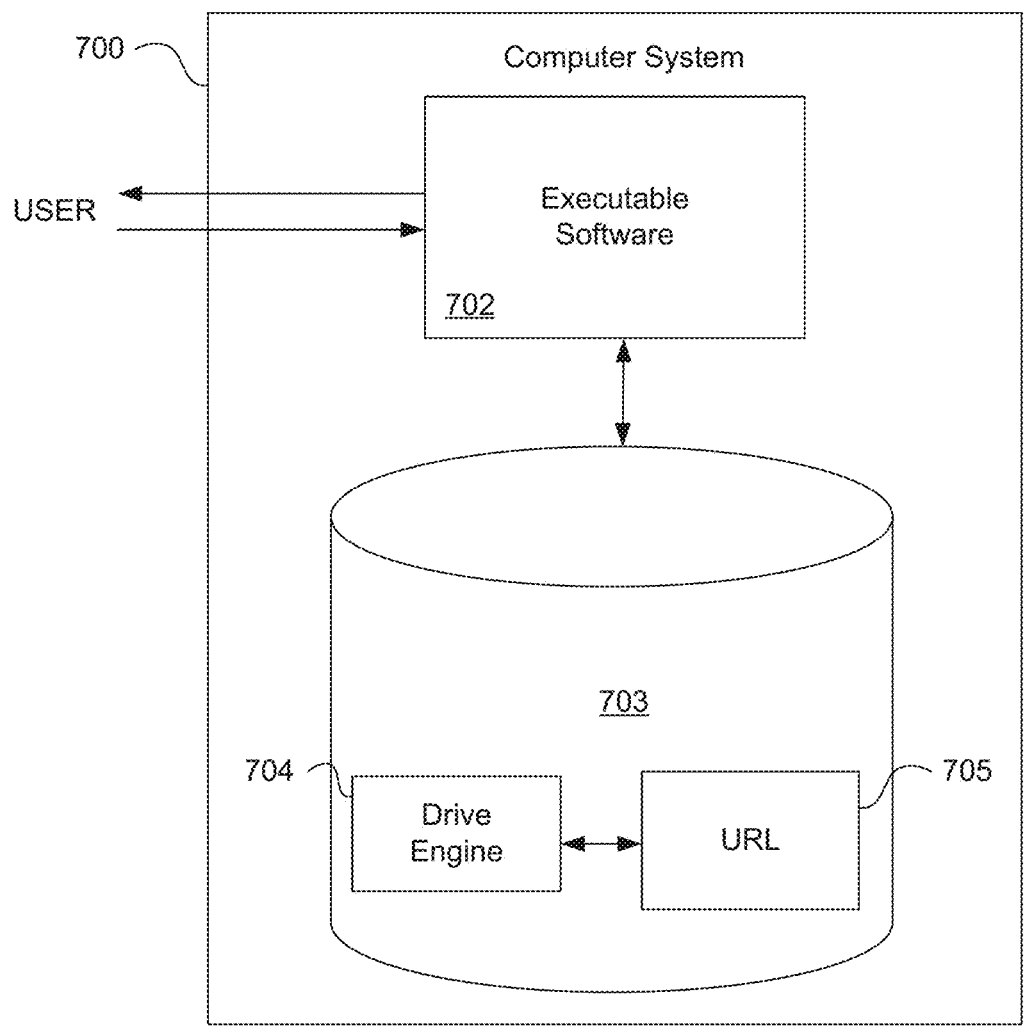
FIG. 7 illustrates hardware of a special purpose computing machine configured to implement cloud drive management according to an embodiment.

Thus FIG. 7 illustrates hardware of a special purpose computing machine configured to perform drive management according to an embodiment. In particular, computer system 700 comprises a processor 702 that is in electronic communication with a non-transitory computer-readable storage medium comprising a database 703. This computer-readable storage medium has stored thereon code 705 corresponding to a drive engine. Code 704 corresponds to a URL (e.g., of a cloud drive REST API). Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1. Computer implemented systems and methods comprising:
receiving from a consumer, a JavaScript Object Notation (JSON) object including a placeholder, a parameter, and selected directory information of a remote storage;
filling in the placeholder with a value stored in a local non-transitory computer readable storage medium;
based upon the value, communicating an action request to the remote storage; and in response to the action request, receiving an output from the remote storage; and communicating the output to the consumer.

Example 2. The computer implemented systems or methods of Example 1 further comprising:

prior to receiving the JSON object, receiving from the consumer a request to perform the action with the remote storage;

in response to the request, retrieving a directory from the remote storage;

generating the JSON object including the directory; and communicating the JSON object to the consumer.

Example 3. The computer implemented systems or methods of Examples 1 or 2 wherein:

the action comprises an upload to the remote storage; and the output comprises a confirmation of successful upload.

Example 4. The computer implemented systems or methods of Example 3 wherein the directory comprises a tree including a destination folder for the upload.

Example 5. The computer implemented systems or methods of Examples 1 or 2 wherein:

the action comprises a download from the remote storage; and the output comprises content of a file stored in the remote storage.

Example 6. The computer implemented systems or methods of Example 5 wherein the directory comprises a tree including the file.

Example 7. The computer implemented systems or methods of Examples 1, 2, 3, 4, 5, or 6 wherein the JSON object is received encoded, the method further comprising:

prior to filling in the value to the placeholder, decoding the JSON object.

Example 8. The computer implemented systems or methods of Examples 1, 2, 3, 4, 5, 6, or 7 wherein the parameter includes a session.

Example 9. The computer implemented systems or methods of Examples 1, 2, 3, 4, 5, 6, 7, or 8 wherein:

the non-transitory computer readable storage medium comprises an in-memory database; and an in-memory database engine of the in-memory database fills in the placeholder with the value.

Figure 8:
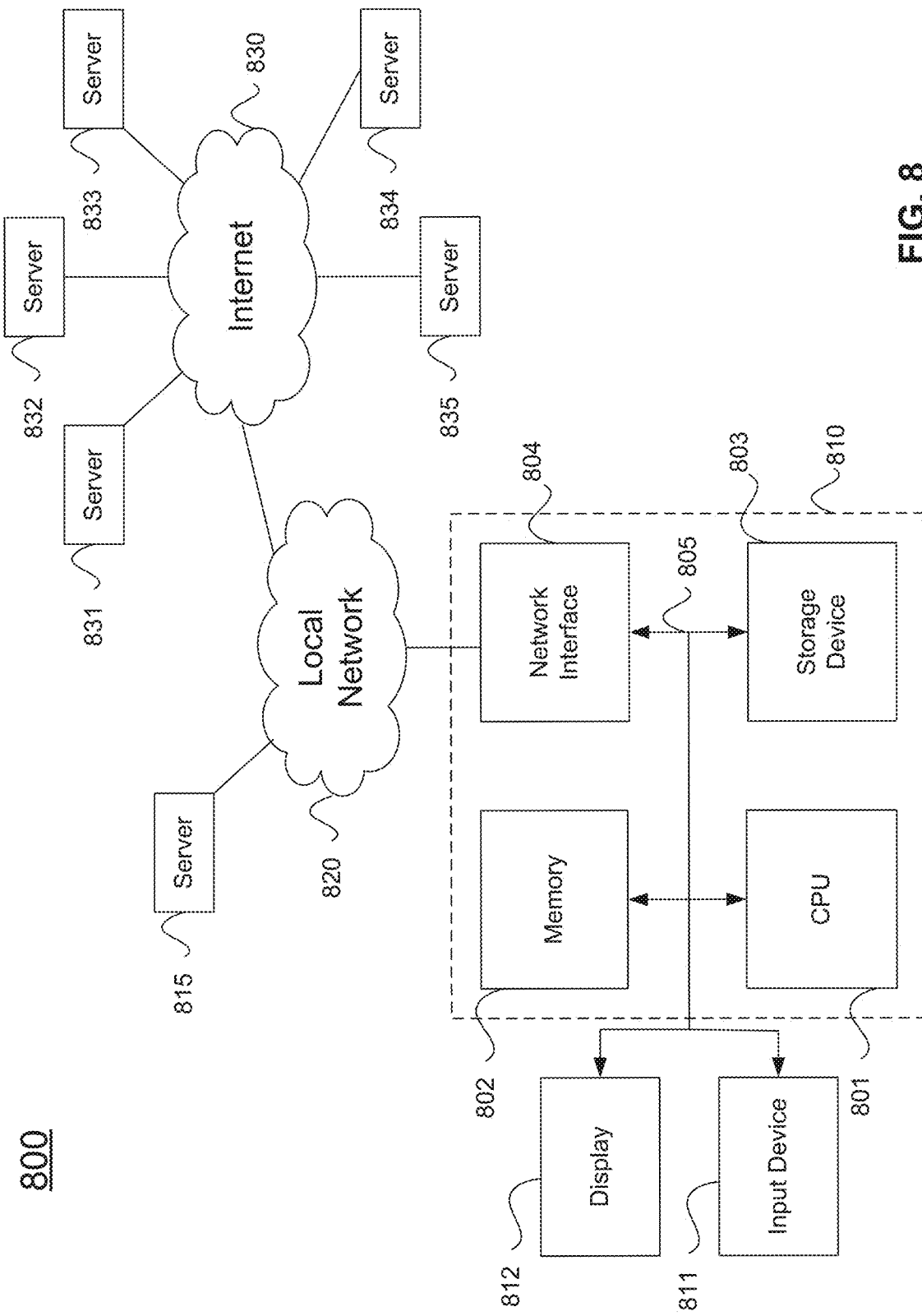
FIG. 8 illustrates an example computer system.

An example computer system 800 is illustrated in FIG. 8. Computer system 810 includes a bus 805 or other communication mechanism for communicating information, and a processor 801 coupled with bus 805 for processing information. Computer system 810 also includes a memory 802 coupled to bus 805 for storing information and instructions to be executed by processor 801, including information and instructions for performing the techniques described above, for example. This memory may also be used for storing variables or other intermediate information during execution of instructions to be executed by processor 801. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 803 may include source code, binary code, or software files for performing the techniques above, for example. Storage device and memory are both examples of computer readable mediums.

Computer system 810 may be coupled via bus 805 to a display 812, such as a Light Emitting Diode (LED) or liquid crystal display (LCD), for displaying information to a computer user. An input device 811 such as a keyboard and/or mouse is coupled to bus 805 for communicating information and command selections from the user to processor 801. The combination of these components allows the user to communicate with the system. In some systems, bus 805 may be divided into multiple specialized buses.

Computer system 810 also includes a network interface 804 coupled with bus 805. Network interface 804 may provide two-way data communication between computer system 810 and the local network 820. The network interface 804 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface z04 sends and receives electrical, electromagnetic, or optical signals that carry digital data streams representing various types of information.

Computer system 810 can send and receive information, including messages or other interface actions, through the network interface 804 across a local network 820, an Intranet, or the Internet 830. For a local network, computer system 810 may communicate with a plurality of other computer machines, such as server 815. Accordingly, computer system 810 and server computer systems represented by server 815 may form a cloud computing network, which may be programmed with processes described herein. In the Internet example, software components or services may reside on multiple different computer systems 810 or servers 831-835 across the network. The processes described above may be implemented on one or more servers, for example. A server 831 may transmit actions or messages from one component, through Internet 830, local network 820, and network interface z04 to a component on computer system 810. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:

in a browsing component, receiving from a drive consumer, a request specifying an action on a file and a first cloud storage drive of a plurality of cloud storage drives having a plurality of cloud storage drive types, wherein different cloud storage drive types comprise different logic for processing REST API calls, the first cloud storage drive having a first cloud storage drive type of the plurality of cloud storage drive types;

in response to the request, and based on one or more interactions with the drive consumer, sending one or more REST API calls to the first cloud storage drive to obtain a destination folder ID, wherein the REST API calls are generated based on the first cloud storage drive type and associated logic;

retrieving the destination folder ID from the first cloud storage drive;

generating an encoded JavaScript Object Notation (JSON) object including the destination folder ID, a first placeholder corresponding to one of the plurality of cloud storage drives, and a second placeholder corresponding to a destination folder;
in an external file manager component,
decoding the encoded JSON object;
filling in the first placeholder with a first value corresponding to the first cloud storage drive stored in a local non-transitory computer readable storage medium and filling in the second placeholder with a second value corresponding to the destination folder ID;
based upon the first value, executing the action on the file, using first logic associated with the first cloud storage drive type for the first cloud storage drive as a REST API call to the first cloud storage drive; and
in response to the action on a file, receiving from the first cloud storage drive an action output; and
communicating the action output to the consumer.

2. A method as in claim 1 wherein:
the action comprises an upload to the remote storage; and
the output comprises a confirmation of successful upload.

3. A method as in claim 1 wherein:
the action comprises a download from the remote storage; and
the output comprises content of a file stored in the remote storage.

4. A method as in claim 1 wherein:
the non-transitory computer readable storage medium comprises an in-memory database; and
the in-memory database engine of the in-memory database fills in the placeholder with the value.

5. A method as in claim 1 wherein the drive consumer is one or more of: a repository access software component, a WEBI software component, and a job processing server.

6. A method as in claim 1 wherein the plurality of cloud storage drives comprise at least two or more of: OneDrive, HANA, and Google Drive.

7. A method as in claim 1 wherein the external file manager component comprises an HTTP client for communicating with the plurality of cloud storage drives.

8. A method as in claim 1 wherein the first placeholder value and the second placeholder value are part of a URL.

9. A non-transitory computer readable storage medium embodying a computer program for performing a method, said method comprising:
in a browsing component,
receiving from a drive consumer, a request specifying an action on a file and a first cloud storage drive of a plurality of cloud storage drives having a plurality of cloud storage drive types, wherein different cloud storage drive types comprise different logic for processing REST API calls, the first cloud storage drive having a first cloud storage drive type of the plurality of cloud storage drive types;
in response to the request, and based on one or more interactions with the drive consumer, sending one or more REST API calls to the first cloud storage drive to obtain a destination folder ID, wherein the REST API calls are generated based on the first cloud storage drive type and associated logic;
retrieving the destination folder ID from the first cloud storage drive;
generating an encoded JavaScript Object Notation (JSON) object including the destination folder ID, a first placeholder corresponding to one of the plurality of cloud storage drives, and a second placeholder corresponding to a destination folder;
in an external file manager component,
decoding the encoded JSON object;
filling in the first placeholder with a first value corresponding to the first cloud storage drive stored in a local non-transitory computer readable storage medium and filling in the second placeholder with a second value corresponding to the destination folder ID;
based upon the first value, executing the action on the file, using first logic associated with the first cloud storage drive type for the first cloud storage drive as a REST API call to the first cloud storage drive; and
in response to the action on a file, receiving from the first cloud storage drive an action output; and
communicating the action output to the consumer.

10. A non-transitory computer readable storage medium as in claim 9 wherein:
the action comprises an upload to the remote storage;
the output comprises a confirmation of successful upload.

11. A non-transitory computer readable storage medium as in claim 9 wherein:
the action comprises a download from the remote storage;
the output comprises content of the file.

12. A non-transitory computer readable storage medium as in claim 9 wherein the plurality of cloud storage drives comprise at least two or more of: OneDrive, HANA, and Google Drive.

13. A non-transitory computer readable storage medium as in claim 9 wherein the external file manager component comprises an HTTP client for communicating with the plurality of cloud storage drives.

14. A non-transitory computer readable storage medium as in claim 9 wherein the first placeholder value and the second placeholder value are part of a URL.

15. A computer system comprising:
one or more processors;
a software program, executable on said computer system, the software program configured to cause an in-memory database engine of an in-memory database to:
in a browsing component,
receive from a drive consumer, a request specifying an action on a file and a first cloud storage drive of a plurality of cloud storage drives having a plurality of cloud storage drive types, wherein different cloud storage drive types comprise different logic for processing REST API calls, the first cloud storage drive having a first cloud storage drive type of the plurality of cloud storage drive types;
in response to the request, and based on one or more interactions with the drive consumer, send one or more REST API calls to the first cloud storage drive to obtain a destination folder ID, wherein the REST API calls are generated based on the first cloud storage drive type and associated logic;
retrieve the destination folder ID from the first cloud storage drive;
generate an encoded JavaScript Object Notation (JSON) object including the destination folder ID, a first placeholder corresponding to one of the plurality of cloud storage drives, and a second placeholder corresponding to a destination folder;
in an external file manager component,
decode the encoded JSON object;
fill in the first placeholder with a first value corresponding to the first cloud storage drive stored in a local non-transitory computer readable storage medium and filling in the second placeholder with a second value corresponding to the destination folder ID;

based upon the first value, execute the action on the file, using first logic associated with the first cloud storage drive type for the first cloud storage drive as a REST API call to the first cloud storage drive; and in response to the action on a file, receive from the first cloud storage drive an action output; and communicating the action output to the consumer.

16. A computer system as in claim 15 wherein:
the action comprises an upload to the remote storage;
the output comprises a confirmation of successful upload.

17. A computer system as in claim 15 wherein:
the action comprises a download from the remote storage;
the output comprises content of the file.

18. A computer system as in claim 15 wherein the plurality of cloud storage drives comprise at least two or more of: OneDrive, HANA, and Google Drive.

19. A computer system as in claim 15 wherein the external file manager component comprises an HTTP client for communicating with the plurality of cloud storage drives.

20. A computer system as in claim 15 wherein the first placeholder value and the second placeholder value are part of a URL.

* * * * *